(12) United States Patent
Mhetar et al.

(10) Patent No.: US 7,253,227 B2
(45) Date of Patent: Aug. 7, 2007

(54) POLY(ARYLENE ETHER) COMPOSITION USEFUL IN BLOW MOLDING

(75) Inventors: Vijay R. Mhetar, Slingerlands, NY (US); Robert John Hossan, Delmar, NY (US); William Eugene Pecak, Cohoes, NY (US)

(73) Assignee: General Electric Company, Schenectady, NY (US)

( * ) Notice: Subject to any disclaimer, the term of this patent is extended or adjusted under 35 U.S.C. 154(b) by 594 days.

(21) Appl. No.: 10/248,125

(22) Filed: Dec. 19, 2002

(65) Prior Publication Data

US 2004/0122170 A1    Jun. 24, 2004

(51) Int. Cl.
    *C08F 290/04*    (2006.01)
(52) U.S. Cl. .................. 524/504; 524/505; 524/508; 524/520; 525/68; 525/92 D; 525/96
(58) Field of Classification Search ............ 524/495, 524/504, 505, 508, 520, 526; 525/68, 69, 525/92 D, 96, 99
    See application file for complete search history.

(56) References Cited

U.S. PATENT DOCUMENTS

| | | | |
|---|---|---|---|
| 2,933,480 A | 4/1960 | Gresham | |
| 3,093,621 A | 6/1963 | Gladding | |
| 3,211,709 A | 10/1965 | Adamek et al. | |
| 3,646,168 A | 2/1972 | Barrett | |
| 3,790,519 A | 2/1974 | Wahlborg | |
| 3,884,993 A | 5/1975 | Gros | |
| 3,894,999 A | 7/1975 | Boozer et al. | |
| 4,059,654 A | 11/1977 | Von Bodungen et al. | |
| 4,076,698 A | 2/1978 | Anderson et al. | |
| 4,128,607 A | 12/1978 | Shiomura et al. | |
| 4,166,055 A | 8/1979 | Lee, Jr. | |
| 4,252,911 A * | 2/1981 | Simon | 525/54 |
| 4,354,009 A | 10/1982 | Goeke et al. | |
| 4,579,906 A | 4/1986 | Zabrocki et al. | |
| 4,584,334 A | 4/1986 | Lee, Jr. et al. | |
| 4,952,630 A * | 8/1990 | Morgan et al. | 525/72 |
| 5,034,459 A * | 7/1991 | Haaf et al. | 525/68 |
| 5,094,806 A * | 3/1992 | Laughner | 264/523 |
| 5,273,706 A | 12/1993 | Laughner | |
| 5,286,790 A * | 2/1994 | Laughner | 525/67 |
| 5,521,230 A | 5/1996 | Bhatia et al. | |
| 6,096,821 A * | 8/2000 | Adedeji et al. | 524/508 |
| 6,258,879 B1 | 7/2001 | Adedeji et al. | |
| 6,350,804 B2 | 2/2002 | Adedeji et al. | |
| 6,455,636 B2 * | 9/2002 | Sanada | 525/132 |
| 2001/0031808 A1 * | 10/2001 | Adedeji et al. | 524/127 |
| 2002/0156182 A1 * | 10/2002 | Adedeji et al. | 525/64 |

FOREIGN PATENT DOCUMENTS

| | | |
|---|---|---|
| EP | 0 404 261 B1 | 6/1990 |
| EP | 0 905 193 A2 | 9/1998 |
| WO | WO 99/43747 | 2/1999 |
| WO | WO 99/36472 | 7/1999 |
| WO | WO 02/057363 A2 | 7/2002 |
| WO | WO 02/057364 A2 | 7/2002 |
| WO | WO 03/000797 A2 | 3/2003 |

OTHER PUBLICATIONS

"Styrene Polymers", Priddy, Duane, Encyclopedia of Polymer Science and Technology, Oct. 22, 2001.*
EP 0004645. Publication Date of Nov. 24, 1981. Abstract Only. 1 page.
International Search Report Dated Feb. 25, 2004.

* cited by examiner

*Primary Examiner*—Edward J. Cain
(74) *Attorney, Agent, or Firm*—Cantor Colburn LLP

(57) ABSTRACT

A composition comprises poly(arylene ether), a rubber modified poly(alkenyle aromatic) resin, and an unsaturated impact modifier. The composition may further comprise an encapsulated fluoropolymer. The melt strength of the composition, measured as the hang time of an extruded tube, is especially suited for blow molding methods. The composition exhibits good melt strength, surface quality and/or sandability and is particularly useful in blow molding applications.

28 Claims, 2 Drawing Sheets

POLY(ARYLENE ETHER) COMPOSITION USEFUL IN BLOW MOLDING

BACKGROUND OF INVENTION

This disclosure relates to a poly(arylene ether) composition and in particular to a poly(arylene ether) composition suitable for blow molding applications.

Poly(arylene ether) resins are widely used in blow molding operations due to their balance of mechanical and chemical properties. Commercially, poly(arylene ether) resins are often blended with polystyrenes, particularly high impact polystyrenes, to give blends with good heat resistance and flow. The successful use of poly(arylene ether) and poly(arylene ether) blends in blow molding operations, however, depends on the characteristics of the molten resin, particularly the melt strength. Melt strength can be described as the tenacity of a molten strand and indicates the ability of the molten resin to support a stress. Melt strength is of particular importance for the blow molding of large parts.

In blow molding of large parts, a tube of molten polymeric resin is extruded vertically into a mold. The extrudate is pressed into the mold surfaces with a pressurized gas flow, thus shaping the softened polymeric resin. Blow molded parts can have surface imperfections. In addition, blow molded parts often have a parting line resulting from the mold. Both the surface imperfections and the parting line are removed in post-molding processes to generate an acceptable surface for painting operations. The most common method of removing parting lines and surface imperfections is sanding. To facilitate sanding, compositions for blow molding applications should have good sandability (i.e., the ability to be sanded).

SUMMARY OF INVENTION

A blow molding composition comprises about 20 weight percent (wt %) to about 80 wt % poly (arylene ether) resin; about 80 wt % to about 20 wt % rubber-modified poly (alkenyl aromatic) resin; and about 2 wt % to about 15 wt % unsaturated impact modifier; wherein all weight percentages are based on the total weight of the composition.

In another aspect, a blow molding composition comprises about 20 wt % to about 80 wt % poly (arylene ether) resin; about 80 wt % to about 20 wt % rubber-modified poly (alkenyl aromatic) resin; about 0.005 wt % to about 2 wt % encapsulated fluoropolymer; and about 2 wt % to about 15 wt % unsaturated impact modifier, wherein all weight percentages are based on the total weight of the composition.

In another aspect, a method of molding an article comprises melt extruding a composition comprising about 20 wt % to about 80 wt % poly(arylene ether) resin, about 80 wt % to about 20 wt % rubber-modified poly(alkenyl aromatic) resin, and about 2 wt % to about 15 wt % unsaturated impact modifier, wherein all weight percentages are based on the total weight of the composition; and blow molding the extruded composition to result in an article.

BRIEF DESCRIPTION OF DRAWINGS

Referring now to the drawings wherein like elements are numbered alike in several FIGURES.

DETAILED DESCRIPTION

Figure 1:
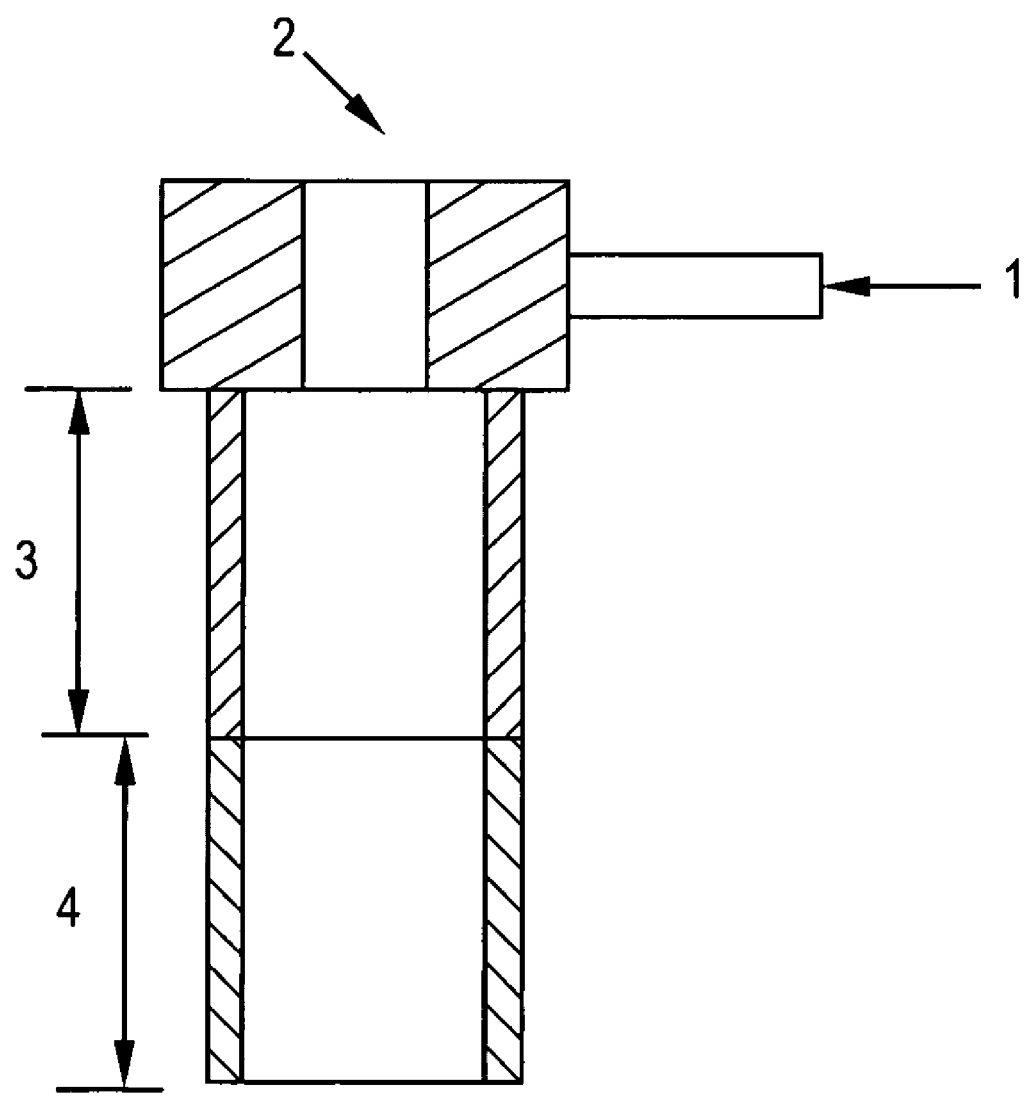
FIG. 1 shows a schematic of the technique used for measurement of melt strength.
Figure 2:
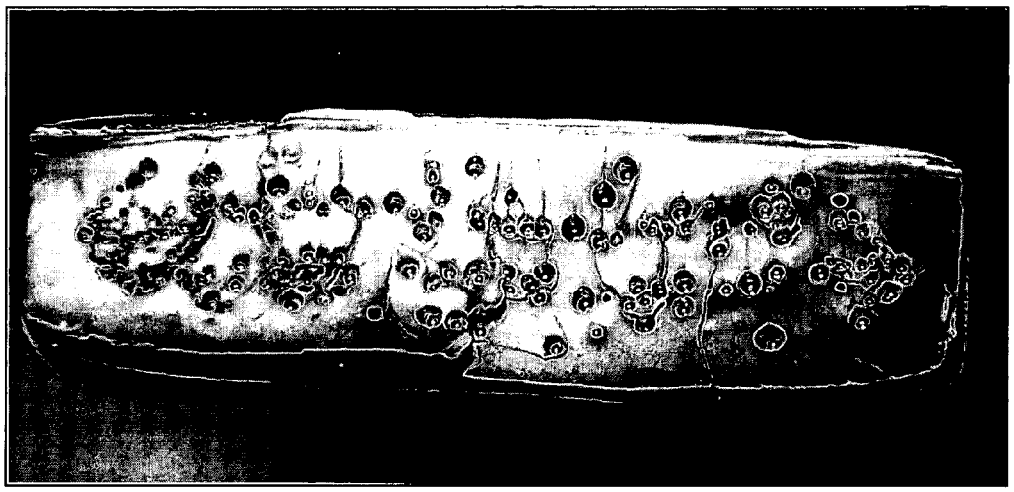
FIG. 2 shows a section of a thermally aged tensile bar of a composition comprising a saturated impact modifier.

One embodiment is a blow molding composition comprising about 20 wt % to about 80 wt % of a poly(arylene ether) resin; about 80 wt % to about 20 wt % of a rubber-modified poly(alkenyl aromatic) resin; and about 2 wt % to about 15 wt % of an unsaturated impact modifier and optionally about 0.005 wt % to about 2 wt % of an encapsulated fluoropolymer, wherein all weight percentages are based on the total weight of the composition. The composition is particularly useful in blow molding operations where melt strength, or the ability of the melted resin to support a stress, is a factor. Melt strength can be quantified as hang time, i.e., the time to sag an extruded tube under its own weight from a first fixed length to a second fixed length. In addition to suitable melt strength, a molded article comprising the above described composition has sandability suitable for post mold processing. The combination of melt strength and sandability of the composition and articles disclosed herein make them especially useful in blow molding of large parts.

Also related to the sandability of the composition is the surface quality of an article molded from the composition. While an article having good sandability is preferred, an article having a good surface quality, i.e., a surface having no visible surface defects immediately after release from the mold, is also preferred. Visible surface defects are surface defects larger than about 40 micrometers in size.

Both the particle size of the modified poly(alkenyl aromatic) resin and the use of an unsaturated impact modifier in the composition affect the surface quality. Unexpectedly, a modified poly(alkenyl aromatic) resin with a relatively large particle size of about 5 to about 20 micrometers produces a smoother surface in an article molded from the disclosed composition than an article molded from a similar composition using a modified poly(alkenyl aromatic) resin with a particle size of less than 5 micrometers. Also unexpectedly, the use of an unsaturated rather than a saturated impact modifier affects the surface quality of an article molded from the disclosed composition. Typically, saturated impact modifiers are used blow molding compositions because they have greater thermal stability compared to unsaturated impact modifiers. It has, however, been discovered that compared to saturated impact modifiers, use of unsaturated impact modifiers in the disclosed composition results in a molded article having fewer surface defects and also fewer bubbles within the molded article. An article having a good surface quality will require less sanding to produce a finished article.

The composition comprises a poly(arylene ether). The term poly(arylene ether) includes polyphenylene ether (PPE) and poly(arylene ether) copolymers; graft copolymers; poly(arylene ether) ether ionomers; block copolymers of alkenyl aromatic compounds, vinyl aromatic compounds, and poly(arylene ether), and the like; and combinations comprising at least one of the foregoing poly (arylene ethers). Poly(arylene ether)s, per se, are known polymers comprising a plurality of structural units of the formula (I):

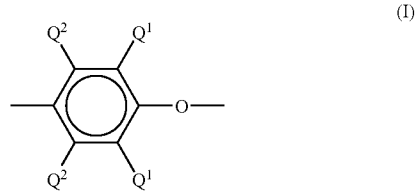

wherein for each structural unit, each $Q^1$ is independently halogen, primary or secondary lower alkyl (e.g., alkyl containing up to 7 carbon atoms), phenyl, haloalkyl, aminoalkyl, hydrocarbonoxy, halohydrocarbonoxy wherein at least two carbon atoms separate the halogen and oxygen atoms, or the like; and each $Q^2$ is independently hydrogen, halogen, primary or secondary lower alkyl, phenyl, haloalkyl, hydrocarbonoxy, halohydrocarbonoxy wherein at least two carbon atoms separate the halogen and oxygen atoms, or the like. Preferably, each $Q^1$ is alkyl or phenyl, especially $C_{1-4}$ alkyl, and each $Q^2$ is hydrogen.

Both homopolymer and copolymer poly(arylene ether) are included. The preferred homopolymers are those containing 2,6-dimethylphenylene ether units. Suitable copolymers include random copolymers containing, for example, such units in combination with 2,3,6-trimethyl-1,4-phenylene ether units or copolymers derived from copolymerization of 2,6-dimethylphenol with 2,3,6-trimethylphenol. Also included are poly(arylene ether) containing moieties prepared by grafting vinyl monomers or polymers such as polystyrenes, as well as coupled poly(arylene ether) in which coupling agents such as low molecular weight polycarbonates, quinones, heterocycles and formals undergo reaction in known manner with the hydroxy groups of two poly(arylene ether) chains to produce a higher molecular weight polymer. Poly(arylene ether) resins further include combinations comprising at least one of the above.

The poly(arylene ether) generally has a number average molecular weight of about 3,000 to about 40,000 atomic mass units (amu) and a weight average molecular weight of about 20,000 to about 80,000 amu, as determined by gel permeation chromatography. The poly(arylene ether) can have an intrinsic viscosity of about 0.30 deciliters/gram (dl/g) to about 0.46 dl/g, preferably about 0.32 dl/g to about 0.40 dl/g, more preferably about 0.33 dl/g to about 0.38 dl/g, as measured in chloroform at 25° C. It is also possible to utilize a high intrinsic viscosity poly(arylene ether) and a low intrinsic viscosity poly(arylene ether) in combination. Determining an exact ratio, when two intrinsic viscosities are used, will depend somewhat on the exact intrinsic viscosities of the poly (arylene ethers) used and the ultimate physical properties that are desired.

The poly(arylene ether) is typically prepared by the oxidative coupling of at least one monohydroxyaromatic compound such as 2,6-xylenol or 2,3,6-trimethylphenol. Catalyst systems are generally employed for such coupling; they typically contain at least one heavy metal compound such as a copper, manganese or cobalt compound, usually in combination with various other materials.

Particularly useful poly(arylene ethers) for many purposes are those which comprise molecules having at least one aminoalkyl-containing end group. The aminoalkyl radical is typically located in an ortho position to the hydroxy group. Products containing such end groups may be obtained by incorporating an appropriate primary or secondary monoamine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A substantial proportion of the polymer molecules, typically constituting as much as about 90% by weight of the polymer, may contain at least one of said aminoalkyl-containing and 4-hydroxybiphenyl end groups.

It will be apparent to those skilled in the art from the foregoing that the contemplated poly (arylene ether) includes all those presently known, irrespective of variations in structural units or ancillary chemical features.

The poly(arylene ether) comprises greater than or equal to about 20 weight percent (wt %), preferably greater than or equal to about 30 wt %, and more preferably greater than or equal to about 35 wt % of the total weight of the composition. The poly(arylene ether) comprises less than or equal to about 80 wt %, preferably less than or equal to about 60 wt %, and more preferably less than or equal to about 50 wt % of the total weight of the composition.

The composition comprises a rubber-modified poly(alkenyl aromatic) resin. A rubber-modified poly(alkenyl aromatic) resin generally comprises a polymer derived from at least one alkenyl aromatic monomer, and further comprises a rubber modifier in the form of a blend and/or a graft. The alkenyl aromatic monomer has the formula (II)

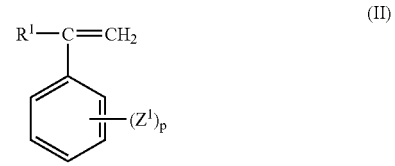

wherein $R^1$ is hydrogen, lower alkyl or halogen; $Z^1$ is vinyl, halogen or lower alkyl; and p is 0 to 5. Preferred alkenyl aromatic monomers include styrene, chlorostyrene, and vinyltoluene. The rubber modifier may be a polymerization product of at least one $C_4$-$C_{10}$ nonaromatic diene monomer, such as butadiene or isoprene. The rubber-modified poly(alkenyl aromatic) resin comprises about 98 wt % to about 70 wt % of the poly(alkenyl aromatic) resin and about 2 wt % to about 30 wt % of the rubber modifier, preferably about 88 wt % to about 94 wt % of the poly(alkenyl aromatic) resin and about 6 wt % to about 12 wt % of the rubber modifier, based on the total weight of the rubber-modified poly(alkenyl aromatic) resin.

Highly preferred rubber-modified poly(alkenyl aromatic) resins include the styrene-butadiene copolymers containing about 80 wt % to about 94 wt % styrene and about 6 wt % to about 20 wt % butadiene. These styrene-butadiene copolymers, also known as high-impact polystyrenes or HIPS, are commercially available as, for example, GEH 1897 from General Electric Company, and EB6755 and EC2100 from Chevron Chemical Company. A preferred HIPS is EB6755. Preferably, the rubber-modified poly(alkenyl aromatic) resin has a particle size of about 2 micrometers to about 20 micrometers, preferably about 4 micrometers to about 10 micrometers, and more preferably about 4 to about 8 micrometers.

The rubber-modified poly(alkenyl aromatic) resin comprises greater than or equal to about 20 weight percent (wt %), preferably greater than or equal to about 30 wt %, and more preferably greater than or equal to about 40 wt % of the total weight of the composition. The rubber-modified poly(alkenyl aromatic) resin comprises less than or equal to about 80 wt %, preferably less than or equal to about 70 wt %, more preferably less than or equal to about 60 wt % of the total weight of the composition.

The composition preferably contains one or more unsaturated impact modifiers. Unsaturated impact modifiers are preferred to saturated impact modifiers because the articles molded from a composition comprising an unsaturated impact modifier exhibit a better quality surface than those molded from compositions comprising saturated impact modifiers. The unsaturated impact modifier comprises at least about 30 wt %, and preferably at least about 60 wt % of ethylenically unsaturated structural units; i.e., units in the polymer chain (mers) which contain ethylenically unsaturated carbon-carbon bonds. Such units are most often derived from dienes such as butadiene and isoprene. A preferred unsaturated impact modifier is SBS KD1101 from Shell Chemical Company.

Various mixtures of the aforementioned impact modifiers are also sometimes useful. The amount of the impact modifier is an amount effective to improve the physical properties, for example, the ductility of the composition when compared to the same composition without an impact modifier. Improved ductility can be indicated by increased impact strength, increased tensile elongation to break, or both increased impact strength and increased tensile elongation to break. Generally the unsaturated impact modifier comprises greater than or equal to about 2.0 weight percent (wt %), preferably greater than or equal to about 3.0 wt %, and more preferably greater than or equal to about 4.0 wt % of the total weight of the composition. The unsaturated impact modifier comprises less than or equal to about 15.0 wt %, preferably less than or equal to about 12.0 wt %, and more preferably less than or equal to about 10.0 wt % of the total weight of the composition.

The exact amount and types or combinations of impact modifiers utilized will depend in part on the requirements needed in the final blend composition and may be determined by one of ordinary skill in the art.

The composition also optionally includes an encapsulated fluoropolymer i.e. a fluoropolymer encapsulated in a polymer. An encapsulated fluoropolymer can be made by polymerizing monomer to form the encapsulating polymer in the presence of the fluoropolymer. Alternatively, the fluoropolymer can be pre-blended in some manner with a second polymer, such as for, example, an aromatic polycarbonte resin or a styrene-acrylonitrile resin as in, for example, U.S. Pat. No. 5,521,230 and 4,579,906. Either method can be used to produce an encapsulated fluoropolymer.

The fluoropolymer in the encapsulated fluoropolymer comprises a fluoropolymer with a melting point of greater than or equal to about 320° C., such as polytetrafluoroethylene. A preferred encapsulated fluoropolymer is a styrene-acrylonitrile copolymer encapsulated polytetrafluoroethylene (i.e., TSAN). TSAN can be made by copolymerizing styrene and acrylonitrile in the presence of an aqueous dispersion of polytetrafluoroethylene (PTFE). TSAN can, for example, comprise about 50 wt % PTFE and about 50 wt % styrene-acrylonitrile copolymer, based on the total weight of the encapsulated fluoropolymer. The styrene-acrylonitrile copolymer can, for example, be about 75 wt % styrene and about 25 wt % acrylonitrile based on the total weight of the copolymer. TSAN offers significant advantages over polytetrafluoroethylene, namely TSAN is more readily dispersed in poly(arylene ether) resins.

The encapsulated fluoropolymer, when present, comprises greater than or equal to about 0.005 weight percent (wt %), preferably greater than or equal to about 0.05 wt %, more preferably greater than or equal to about 0.1 wt % of the total weight of the composition. The encapsulated fluoropolymer, when present, comprises less than or equal to about 2.0 wt %, preferably less than or equal to about 1.0 wt %, and more preferably less than or equal to about 0.7 wt % of the total weight of the composition.

The composition optionally comprises a homopolymer of an alkenyl aromatic monomer, wherein the alkenyl aromatic monomer has the formula (II)

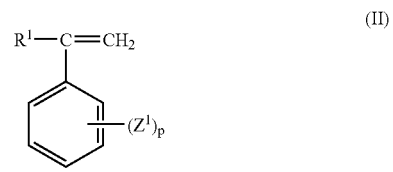

wherein $R^1$ is hydrogen, lower alkyl or halogen; $Z^1$ is vinyl, halogen or lower alkyl; and p is 0 to 5. Preferred alkenyl aromatic monomers include styrene, chlorostyrene, and vinyltoluene. A particularly preferred homopolymer of an alkenyl aromatic monomer is the homopolymer derived from styrene (i.e., homopolystyrene). The homopolystyrene preferably comprises at least about 99% of its weight, more preferably about 100% of its weight, from styrene.

Highly preferred homopolystyrenes include atactic and syndiotactic homopolystyrenes. Preferably, the homopolystyrene is atactic polystyrene. Suitable atactic homopolystyrenes are commercially available as, for example, EB3300 from Chevron, and P1800 from BASF. The homopolymer of an alkenyl aromatic monomer, when present, comprises greater than or equal to about 5.0 weight percent (wt %), preferably greater than or equal to about 6.0 wt %, and more preferably greater than or equal to about 8.0 wt % of the total weight of the composition. The homopolymer of an alkenyl aromatic monomer, when present, comprises less than or equal to about 40 wt %, preferably less than or equal to about 20 wt %, more preferably less than or equal to about 15 wt % based on the total weight of the composition.

Polyolefins which can optionally be included in the composition are of the general structure $C_nH_{2n}$ and include polyethylene, polypropylene and polyisobutylene with preferred homopolymers being polyethylene, LLDPE (linear low density polyethylene), HDPE (high density polyethylene) and MDPE (medium density polyethylene) and isotatic polypropylene. Polyolefin resins of this general structure and methods for their preparation are well known in the art and are described for example in U.S. Pat. Nos. 2,933,480, 3,093,621, 3,211,709, 3,646,168, 3,790,519, 3,884,993, 3,894,999, 4,059,654, 4,166,055 and 4,584,334.

Particularly preferred polyolefins include linear low density polyethylenes; (LLDPE). Linear-low density polyethylenes are well known materials that are available commercially, for example, from Exxon under the tradename ESCORENE® or from Dow Chemicals under the tradename DOWLEX®. Alternatively, they may readily be prepared by state of the art polymerization processes such as those described in U.S. Pat. Nos. 4,128,607, 4,354,009, 4,076,698, and European Patent Application No. 4645 (published Oct. 17, 1979). These polymers have a density of about 0.89 to about 0.96 gram/milliliter, preferably of about 0.915 to about 0.945 gram/milliliter. Linear low density polyethylene polymers are co-polymers of ethylene and a minor amount, typically less than about 20 mole percent, preferably less than about 15 mole percent, of an alpha olefin of 3 to 18 carbon atoms, preferably 3 to 10 carbon atoms, most preferably 4 to 8 carbon atoms. When present, the polyolefin comprises greater than or equal to about 0.2 weight percent (wt %), preferably greater than or equal to about 0.4 wt %, and more preferably greater than or equal to about 0.6 wt % of the total weight of the composition. The polyolefin comprises less than or equal to about 4.0 wt %, preferably less than or equal to about 3.0 wt %, and more preferably less than or equal to about 2.0 wt % of the total weight of the composition.

Carbon black may also optionally be used in the composition. Commercially available carbon blacks may be a carbon black that is used in modifying the properties of thermoplastic resins. Such carbon blacks are sold under a variety of trade names, including but not limited to S.C.F. (Super Conductive Furnace), E.C.F. (Electric Conductive Furnace), Ketjen Black EC (available from Akzo Co., Ltd.), acetylene black and Monarch 800 (Cabot Corp.). When used, the carbon black comprises greater than or equal to about 0.05 weight percent (wt %), preferably greater than or equal to about 0.1 wt %, and more preferably greater than or equal to about 0.25 wt % of the total weight of the composition. The carbon black comprises less than or equal to about 4.0 wt %, preferably less than or equal to about 3.0 wt %, and more preferably less than or equal to about 1.5 wt % of the total weight of the composition.

The composition can also include effective amounts of at least one additive selected from the group consisting of anti-oxidants, flame retardants, drip retardants, dyes, pigments, colorants, stabilizers, small particle minerals such as clay, mica, and talc, antistatic agents, plasticizers, lubricants, mixtures thereof, and the like. These additives are known in the art, as are their effective levels and methods of incorporation. A preferred antioxidant is ULTRANOX 626 (GE Plastics Co.). Effective amounts of the additives vary widely, but they are usually present in an amount up to about 50 wt % of the total weight of the composition.

The preparation of the composition can be achieved by blending the ingredients under conditions suitable for the formation of an intimate blend. Such conditions often include solution blending or melt mixing in single or twin screw type extruders, mixing bowl, roll, kneader, or similar mixing device that can apply a shear to the components. Twin screw extruders are often preferred due to their more intensive mixing capability over single screw extruders. A vacuum can be applied to the blend through at least one vent port in the extruder.

The blend is preferably sufficiently heated such that the polymeric components are in the molten phase, thereby enabling intimate mixing. Typically temperatures up to about 360° C. can be employed, with about 220° C. to about 350° C. preferred, and about 260° C. to about 340° C. especially preferred.

The composition can be molded into useful articles by a variety of techniques such as, for example, blow molding, compression molding, thermoforming, and injection molding, among others known in the art. A preferred method of molding is blow molding. In conventional blow molding processes, a tube of a molten polymeric composition is extruded vertically into a mold. The extrudate than can be pressed onto the mold surface using a pressurized gas flow, typically air or an inert gas such as nitrogen, thus forming the heat-softened polymer. Blow molding can include extrusion blow molding, injection blow molding, stretch extrusion blow molding, stretch injection blow molding, profile blow molding and rotational blow molding. The articles that can be formed include bottles, automotive spoilers, snowboards, other containers, floor pads, and the like.

One important feature of the poly(arylene ether) composition is the melt strength. The melt strength of the composition can be measured in terms of hang time. FIG. 1 shows an apparatus to measure hang time having extrusion tube 1 and tube die 2. Hang time is defined as the time to sag an extruded tube under its own weight from an initial fixed length 3 to a final fixed length 4. The hang time is the difference in seconds between the final time and the initial time. The test is performed at a temperature of 260° C. For the data presented in FIG. 1, the diameter of the extruded tube was about 2.5 centimeters and the thickness of the tube was about 0.1 centimeter. The initial fixed length 3 was 30 centimeters and the final fixed length 4 was 75 centimeters. Preferred hang times for the compositions are greater than or equal to about 3 seconds, preferably greater than or equal about 4 seconds, and more preferably greater than or equal to about 5 seconds. Preferred hang times are less than or equal to about 90 seconds, preferably less than or equal to about 60 seconds, and more preferably less than or equal to about 40 seconds.

While sandability is important for blow molded parts, it is preferred that such parts do not require substantial sanding. One factor in eliminating or reducing the amount of sanding required is the surface quality of the blow molded part. It has been discovered that the rubber-modified poly(alkenyl aromatic) resin and the impact modifier can affect the surface quality of the poly(arylene ether) compositions. Regarding the rubber-modified poly(alkenyl aromatic) resin, the particle size can affect the surface quality and sandability of a blow molded part. In particular, if the particle size of the rubber-modified poly(alkenyl aromatic) resin is less than 2 micrometers, the surface quality of a blow molded part is poor and requires sanding. If the particle size of the rubber-modified poly(alkenyl aromatic) resin is about 2 micrometers to about 20 micrometers, however, the surface quality of a molded part is greatly improved such that less sanding is required. Regarding the impact modifier, an unsaturated impact modifier is required to give an acceptable surface of a molded part. In particular, use of a hydrogenated or saturated impact modifier can result in blow molded parts having surface defects.

Figure 3:
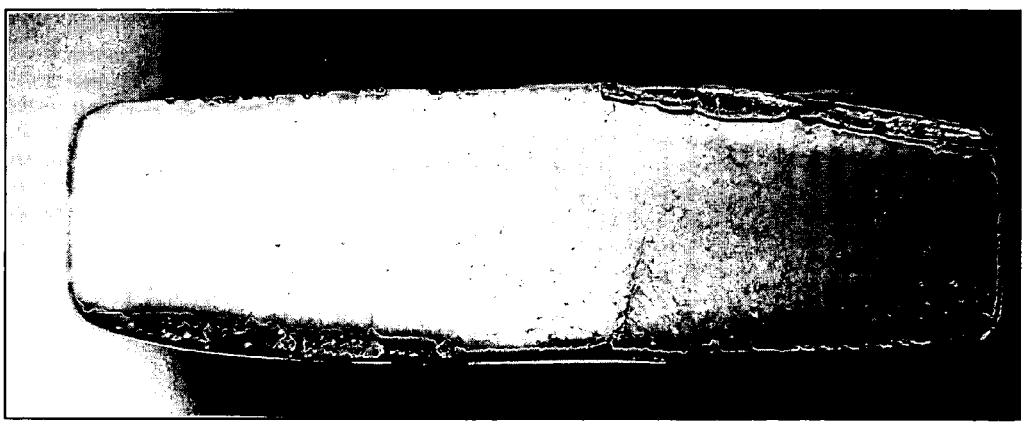
FIG. 3 shows a section of a thermally aged tensile bar of a composition comprising an unsaturated impact modifier.

To show the effect of the impact modifier on surface quality, compositions were formed using either KRATON G1651, a saturated impact modifier or KRATON D1101, an unsaturated impact modifier. Tensile bars of 0.125 inch by 0.5 inch were formed. Thermal aging experiments were performed to stimulate blow molding conditions by heating the molded bars in an oven at 127° C. (460° F.) (i.e., approximately blow molding temperature) and keeping the specimens at that temperature for 5 minutes. The bars were cooled to room temperature and cross-sections were examined. As shown in FIG. 3, samples comprising a saturated impact modifier exhibited a large number of voids in the cross-sections. The voids close to the surface were large enough to be exposed at the surface, thus giving the appearance of a "pit". The samples comprising an unsaturated impact modifier, in contrast, show substantially no voids in the cross-sections examined (FIG. 4). Without being held to theory, it is believed that the voids are generated due to the thermal dacomposition of the saturated rubber. By employing an unsaturated rubber, the formation of "pits" can be substantially avoided thus resulting in a smoother more acceptable surface quality.

The invention is further illustrated by the following non-limiting examples.

EXAMPLES 1-7

Compositions were mixed using the components shown in Table 1 according to the amounts listed in Table 2.

TABLE 1

| Component | Description | Tradename/Supplier |
| --- | --- | --- |
| 0.33 IV PPE | Poly(phenylene ether) with intrinsic viscosity (IV) of 0.33 dl/g | GE Plastics |
| 0.46 IV PPE | Poly(phenylene ether) with intrinsic viscosity (IV) of 0.46 dl/g | GE Plastics |
| HIPS | High impact polystyrene | EB6755/Chevron Chemical Co. |
| TSAN | Polytetrafluoroethylene dispersed in Styrene-Acrylonitrile copolymer at 50/50 weight ratio | TSAN/GE Plastics |
| Unsaturated impact modifier | Styrene butadiene block copolymer | KRATON D1101/ Shell Chemical Co. |
| Homopolystyrene | Atactic homopolystyrene | EB3300/Chevron, or P1800/BASF |

The components were mixed according to the weight percentages shown in Table 2 and extruded at a temperature of 260° C. to 340° C.

Flex modulus and flex yield strength were measured according to ASTM D790. The heat deflection temperature (HDT) at 246 psi and 66 psi were measured according to ASTM D648. Tensile yield strength and % elongation were measured by ASTM D638. Notched Izod impact strengths at 23° C. and −30° C. were measured on molded impact bars (3.2 millimeters thick) according to ASTM D256. Results are shown in Table 2.

strength and sandability of the compositions makes them particularly useful in blow molding applications.

The use of an encapsulated fluoropolymer allows for a more uniform dispersion of the fluoropolymer in the composition. Compositions made with unencapsulated polytetrafluoroethylene have highly variable properties due to the poor dispersion of the polytetrafluoroethylene in the poly (arylene ether). The improved dispersion obtained with encapsulated fluoropolymers leads to compositions having substantially uniform properties.

Another feature of the composition is sandability or the ability of a composition to be sanded. Sandability can be measured as the amount of weight lost after rotating an abrasion wheel 1000 times over a molded disk. Sandability of the composition is preferably about 50 milligrams to about 80 milligrams, with about 65 milligrams to about 75 milligrams preferred. The sandability of the composition is shown as weight lost in the abrasion test in milligrams in Table 2. As shown in Table 2, inventive compositions 2, 3 and 6 maintain both their sandability and hang time as compared to comparative example 1 which has a short hang time. In addition, the sandability of the poly(arylene ether) composition and the intrinsic viscosity of the poly(arylene ether) are related. In particular, the intrinsic viscosity of the poly(arylene ether) should be about 0.30 deciliters/gram to 0.46 deciliters/gram to give samples with acceptable sandabilty for blow molding applications.

In summary, disclosed herein is a poly(arylene ether) composition suitable for blow molding. The composition

TABLE 2

| Component | *1 | 2 | 3 | 4 | 5 | 6 | *7 |
| --- | --- | --- | --- | --- | --- | --- | --- |
| 0.33 IV PPE | 38 | 38 | 38 | 38 | 38 | 38 | 0 |
| 0.46 IV PPE | 0 | 0 | 0 | 0 | 0 | 0 | 38 |
| SBS KD1101 | 6 | 6 | 6 | 6 | 6 | 6 | 6 |
| Homopolystyrene | 12 | 12 | 12 | 12 | 12 | 12 | 12 |
| HIPS | 42 | 42 | 42 | 42 | 42 | 42 | 42 |
| TSAN | 0 | 0.1 | 0.2 | 0.3 | 0.4 | 0.5 | 0 |
| Other additives | 2.3 | 2.3 | 2.3 | 2.3 | 2.3 | 2.3 | 2.3 |
| Properties | | | | | | | |
| Flex Modulus, psi | 300300 | 300259 | 302746 | 301054 | 301380 | 300267 | 317900 |
| Flex Yield Strength, psi | 9960 | 9966 | 10150 | 10276 | 10381 | 9915 | 10482 |
| HDT 264PSI, F | 249.2 | 247.972 | 250.803 | 246.3 | 246.914 | 246.2 | 246.2 |
| HDT 66PSI, F | 273.9 | 274.9 | 274.3 | 273.7 | 273.7 | 273.9 | 273.6 |
| Notched Izod 23 C., ft.lb/in | 7.1 | 7.1 | 7.1 | 6.8 | 7.1 | 7 | 8.8 |
| Notched Izod −30 C., ft.lb/in | 3.5 | 3.2 | 3.1 | 3.1 | 3.2 | 3 | 5.5 |
| Tensile Yield Strength, psi | 7234 | 7315 | 7417 | 7488 | 7554 | 7308 | 7436 |
| % Elongation | 50.1 | 52.5 | 52 | 48.6 | 49.4 | 50.4 | 45.5 |
| Hang time, s | 2.2 | 4.8 | 7.2 | 12.5 | 43 | >60 | 6.2 |
| Weight loss in abrasion test, mg | 71.9 | 72.6 | 70.4 | — | — | 66.8 | 37.7 |

*denotes comparative examples

As can be seen from the data in Table 2, compositions containing 0.33 deciliters/gram intrinsic viscosity poly (arylene ether) with increasing amounts of TSAN have hang times similar to, or even greater than, compositions containing 0.46 deciliters/gram intrinsic viscosity poly(arylene ether) and no TSAN. The hang times for 0.33 deciliters/gram intrinsic viscosity poly(arylene ether) with TSAN are 2-fold to more than 30-fold greater than the hang times for similar compositions without TSAN. Further, the compositions containing 0.33 deciliters/gram intrinsic viscosity poly (arylene ether) and TSAN exhibit improved sandability over similar compositions without TSAN. The balance between melt exhibits melt strengths measured as the hang time of an extruded tube which make it particularly useful for blow molding. Hang times of an extruded tube of diameter about 25 centimeters and thickness about 0.1 centimeters, sagging from a length of 30 centimeters to 75 centimeters are preferably about 4 seconds to about 90 seconds. Preferably, the compositions have a surface quality that does not require post-molding treatment such as sanding. When sanding is used, it is preferred that the composition exhibits sandability (i.e., measured as weight lost) of about 65 milligrams to about 75 milligrams after rotating an abrasion wheel 1000 times over a molded disk. The combination of melt strength and acceptable surface appearance or sandability provides poly(arylene) ether compositions particularly useful for blow molding.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

All cited patents, patent applications, and other references are incorporated herein by reference in their entirety.

The invention claimed is:

1. A blow molding composition comprising:
   about 20 wt % to about 80 wt % of a poly(arylene ether) resin;
   about 80 wt % to about 20 wt % of a high impact polystyrene; and
   about 2 wt % to about 15 wt % of an unsaturated impact modifier;
   wherein all weight percentages are based on the total weight of the composition and prior to blending the poly(arylene ether), the high impact polystyrene and the unsaturated impact modifier, the high impact polystyrene has particle sizes of about 2 micrometers to about 20 micrometers.

2. The composition of claim 1, wherein the poly(arylene ether) has an intrinsic viscosity of about 0.30 deciliters/gram to about 0.46 deciliters/gram as measured in chloroform at 25° C.

3. The composition of claim 1, wherein the composition further comprises an encapsulated fluoropolymer.

4. The composition of claim 3, wherein the encapsulated fluoropolymer comprises a styrene acrylonitrile encapsulated polytetrafluoroethylene.

5. The composition of claim 1, further comprising a homopolystyrene in an amount of about 5 wt % to about 40 wt % of the total weight of the composition.

6. The composition of claim 1, further comprising a polyolefin.

7. The composition of claim 1, wherein the unsaturated impact modifier comprises greater than about 30 wt % ethylenically unsaturated structural units based on the total weight of the impact modifier.

8. The composition of claim 1, further comprising carbon black.

9. The composition of claim 1, wherein the hang time of an extruded tube of the composition having a diameter of about 25 centimeters and a thickness of about 0.1 centimeters, sagging from a length of 30 centimeters to 75 centimeters, is about 4 seconds to about 90 seconds.

10. A blow molding composition comprising:
    about 20 wt % to about 80 wt % of a poly(arylene ether) resin;
    about 80 wt % to about 20 wt % of a high impact polystyrene;
    about 0.005 wt % to about 2 wt % of an encapsulated fluoropolymer; and
    about 2 wt % to about 15 wt % of an unsaturated impact modifier;
    wherein all weight percentages are based on the total weight of the composition and prior to blending the poly(arylene ether), the high impact polystyrene and the unsaturated impact modifier, the high impact polystyrene has particle sizes of about 2 micrometers to about 20 micrometers.

11. The composition of claim 10, wherein the hang time of an extruded tube of the composition having a diameter of about 25 centimeters and a thickness of about 0.1 centimeters, sagging from a length of 30 centimeters to 75 centimeters, is about 4 seconds to about 90 seconds.

12. The composition of claim 11, wherein the hang time is about 5 seconds to about 30 seconds.

13. The composition of claim 10, wherein the encapsulated fluoropolymer comprises a styrene-acrylonitrile copolymer encapsulated polytetrafluoroethylene.

14. The composition of claim 10, further comprising a polyolefin.

15. The composition of claim 10, wherein the poly(arylene ether) has an intrinsic viscosity of about 0.30 deciliters/gram to about 0.46 deciliters/gram as measured in chloroform at 25° C.

16. The composition of claim 10, further comprising a homopolystyrene in an amount of about 5 wt % to about 40 wt % of the total weight of the composition.

17. The composition of claim 10, wherein the unsaturated impact modifier comprises greater than about 30 wt % ethylenically unsaturated structural units based on the total weight of the impact modifier.

18. A method of molding an article comprising:
    melt extruding a composition comprising
    about 20 wt % to about 80 wt % of a poly(arylene ether) resin;
    about 80 wt % to about 20 wt % of a high impact polystyrene; and
    about 2 wt % to about 15 wt % of an unsaturated impact modifier;
    wherein all weight percentages are based on the total weight of the composition and prior to blending the poly(arylene ether), the high impact polystyrene and the unsaturated impact modifier, the high impact polystyrene has particle sizes of about 2 micrometers to about 20 micrometers; and
    blow molding the extruded composition to result in an article.

19. The method of claim 18, wherein the poly(arylene ether) has an intrinsic viscosity of about 0.30 deciliters/gram to about 0.46 deciliters/gram as measured in chloroform at 25° C.

20. The method of claim 18, wherein the composition further comprises an encapsulated fluoropolymer.

21. The method of claim 20, wherein the encapsulated fluoropolymer comprises a styrene-acrylonitrile copolymer encapsulated polytetrafluoroethylene.

22. The method of claim 18, wherein the composition further comprises a homopolystyrene in an amount of about 2 wt % to about 40 wt % of the total weight of the composition.

23. The method of claim 18, wherein the composition further comprises a polyolefin.

24. The method of claim 18, wherein the unsaturated impact modifier comprises greater than about 30 wt % ethylenically unsaturated structural units based on the total weight of the impact modifier.

25. The method of claim 18, wherein the composition further comprises carbon black.

26. The method of claim 18, wherein the hang time of an extruded tube of the composition having a diameter of about 25 centimeters and a thickness of about 0.1 centimeters, sagging from a length of 30 centimeters to about 75 centimeters is about 4 seconds to about 90 seconds.

27. The method of claim 26, wherein the hang time is about 5 seconds to about 30 seconds.

28. An article formed by the method of claim 18.

* * * * *

UNITED STATES PATENT AND TRADEMARK OFFICE
CERTIFICATE OF CORRECTION

| | | |
|---|---|---|
| PATENT NO. | : 7,253,227 B2 | Page 1 of 1 |
| APPLICATION NO. | : 10/248125 | |
| DATED | : August 7, 2007 | |
| INVENTOR(S) | : Mhetar et al. | |

It is certified that error appears in the above-identified patent and that said Letters Patent is hereby corrected as shown below:

Column 9:
Line Table 1, after "Table 1" at approx. line 19 insert -- The additives listed in Table 2 are a low linear density polyethylene PETROTHENE/Equistar Chemical), antioxidant (ULTRANOX 626/GE Plastics Co.) and carbon black (Monarch 800/Cabot Corp). --

Signed and Sealed this

Twentieth Day of May, 2008

JON W. DUDAS
*Director of the United States Patent and Trademark Office*